(12) United States Patent
Reckless et al.

(10) Patent No.: US 7,761,927 B2
(45) Date of Patent: Jul. 20, 2010

(54) APPARATUS AND METHOD FOR MONITORING AND CONTROLLING ACCESS TO DATA ON A COMPUTER READABLE MEDIUM

(75) Inventors: Jonny Boyd Reckless, Maidenhead (GB); Ori Dvir, Zoran (IL); Philippe Marcel Henri Selve, Wokingham (GB); Carmen Laura Basile, Maidenhead (GB); Victor Kovner, Maidenhead (GB)

(73) Assignee: Rovi Solutions Limited, Maidenhead (GB)

( * ) Notice: Subject to any disclaimer, the term of this patent is extended or adjusted under 35 U.S.C. 154(b) by 1021 days.

(21) Appl. No.: 11/232,477

(22) Filed: Sep. 21, 2005

(65) Prior Publication Data

US 2007/0079050 A1 Apr. 5, 2007

(51) Int. Cl.
*G06F 21/00* (2006.01)
*G06F 17/30* (2006.01)
*G06F 13/00* (2006.01)
*G06F 21/24* (2006.01)

(52) U.S. Cl. .............. 726/32; 726/27; 705/57; 719/321; 719/322; 719/323

(58) Field of Classification Search ............ 26/27; 726/32
See application file for complete search history.

(56) References Cited

U.S. PATENT DOCUMENTS

| 5,805,800 | A * | 9/1998 | Kotani et al. ............ 726/27 |
| 6,081,897 | A * | 6/2000 | Bersson ................. 726/32 |
| 6,172,664 | B1 | 1/2001 | Nakasuji et al. |
| 2003/0105717 | A1 | 6/2003 | Kim et al. |
| 2004/0103301 | A1 | 5/2004 | Inokuchi et al. |
| 2005/0172122 | A1 | 8/2005 | Risan et al. |
| 2005/0185926 | A1 | 8/2005 | Basile et al. |
| 2005/0259546 | A1 | 11/2005 | Basile et al. |
| 2007/0036356 | A1 * | 2/2007 | Holzapfel et al. ....... 380/201 |

FOREIGN PATENT DOCUMENTS

EP 1 528 557 A1 5/2005
WO WO 01/46952 A2 6/2001

OTHER PUBLICATIONS

International Search Report for PCT/GB2006/003463 mailed Jan. 4, 2007, 2 pages.
DeCSS Central: "More about DeCSS"[Online] Sep. 14, 2005, XP002410468, INET, Retrieved from the Internet : URL :http://www.lemuria.org/DeCSS/decss.html> [retrieved on Dec. 6, 2006], 3 pages.

* cited by examiner

*Primary Examiner*—Matthew T Henning
(74) *Attorney, Agent, or Firm*—Victor H. Okumoto; Andy T. Pho

(57) ABSTRACT

The invention provides a device driver for monitoring and controlling access to data on a computer readable medium. The device driver comprises an interface for access to a device-driver stack for a media drive, a detector for detecting the insertion of a computer readable medium in said media drive, and a monitor for monitoring data transfer from said computer readable medium. The monitor evaluates a behavior characteristic of an application accessing data on said computer readable medium, and indicates when said behavior characteristic fulfills predetermined criteria. A control system is responsive to said monitor for issuing at least one control output when said behavior characteristic fulfills said predetermined criteria. The invention also provides a method of monitoring and controlling access to data on a computer readable medium by means of the device driver.

6 Claims, 13 Drawing Sheets

FIG. 3      CDROM device-driver stack

APPARATUS AND METHOD FOR MONITORING AND CONTROLLING ACCESS TO DATA ON A COMPUTER READABLE MEDIUM

FIELD OF THE INVENTION

The invention concerns apparatus and a method for monitoring and controlling access to data on a computer readable medium, and is particularly applicable to the protection of a data carrying medium against unauthorised copying.

BACKGROUND TO THE INVENTION

Various techniques are known for protecting computer readable media, such as optical discs including CDs and DVDs, against unauthorised copying. Two such methods of protection are described in our earlier U.S. Ser. No. 10/848,879 and U.S. Ser. No. 10/939,186, both of which are incorporated herein by reference.

U.S. Ser. No. 10/848,879 discloses a method of protection in which redundant control data, including errors, is included amongst the data carried by an optical disc. The control data controls access to content files on the optical disc, containing material or content data to be played, and the redundant control data is not utilized during normal playback of the content. However, during unauthorized copying, the redundant control data is accessed and the errors in such data are arranged to frustrate navigation of at least one program path providing access to the content data.

U.S. Ser. No. 10/939,186 discloses a method of protection in which at least one region containing unreadable or subversive data is provided within the content data on an optical disc. Control data on the disc for accessing content files containing the content data ensures that access to the region of unreadable or subversive data is prevented during normal playback. However, in the event of unauthorised copying, the region of unreadable or subversive data is accessed and hinders or prevents copying.

The methods according to these two earlier U.S. patent applications are both passive, in the sense that they rely on data incorporated in the optical disc for protecting the disc against a procedure known as "ripping", i.e. unauthorised copying onto a hard drive of a local computer or network.

Such passive techniques are effective to some extent in protecting against unauthorised copying. However, ripping software is becoming increasingly sophisticated and powerful and increasingly effective in overcoming such passive forms of protection.

There is, therefore, a need for more effective forms of protection against unauthorised copying and for forms of protection that are harder to circumvent.

SUMMARY OF THE INVENTION

It is an object of the invention to provide a means for monitoring and controlling access to data on a computer readable medium, which overcomes the problems described above.

It is another object of the invention to provide a means for authenticating an instance of use of a computer readable medium. Such authentication may be used to verify that the use of the medium is legitimate, as in normal playback, or to permit access to further application functions or other functions, or it may be used to prohibit unauthorised use of the medium, such as ripping.

It is a further object of the present invention to provide an effective apparatus and method for monitoring and controlling access to data on a computer readable medium, which provides improved protection against unauthorised copying.

It is another object of the present invention to provide apparatus and a method for monitoring and controlling access to data on a computer readable medium in the form of an active process installed on the computer, as opposed to passive data provided on the computer readable medium.

According to a first aspect of the present invention, there is provided a device driver for monitoring and controlling access to data on a computer readable medium, comprising: an interface for access to a device-driver stack for a media drive; a detector for detecting the insertion of a computer readable medium in said media drive; a monitor for monitoring data transfer from said computer readable medium and for evaluating a behaviour characteristic of an application reading data on said computer readable medium; and a control system responsive said monitor for issuing at least one control output when said behaviour characteristic fulfills predetermined criteria.

According to another aspect of the present invention, there is provided a method for monitoring and controlling access to data on a computer readable medium, comprising: accessing a device-driver stack for a media drive; detecting the insertion of a computer readable medium in the media drive; monitoring data transfer from the computer readable medium; on the basis of the monitored data transfer evaluating a behaviour characteristic of an application reading data on the computer readable medium; and issuing at least one control output when the behaviour characteristic fulfills predetermined criteria.

In the preferred embodiments described below, the evaluation is based on a behaviour characteristic comprising one of a volume or frequency of data transfer or a pattern of behaviour for accessing data on the computer readable medium.

In the case that either volume or frequency of data is evaluated, then the predetermined criteria may be a threshold value against which a measured volume or frequency value is compared. In the case that a pattern of behaviour is evaluated, the evaluation may be based on a navigation path for accessing the main content on the computer readable medium. The predetermined criteria may then be a preset navigation path identified in control data included on the disc against which a navigation path for the data that is accessed on the disc is compared for a match.

The evaluation is preferably for the purpose of distinguishing between players who are accessing data on the computer readable medium for legitimately playing the main content, and rippers who are accessing the data for the purpose of illegitimately copying the same. In such circumstances, the control output serves respectively to permit or prohibit further access to the computer readable medium for further copying.

In addition or alternatively, the evaluation may be for the purpose of authenticating the user or the use of the computer readable medium for permitting access to further functions.

In such a development of the invention, the control output may be employed to control access to further functions on the computer readable medium in the event that the evaluation has established that the user is a legitimate user.

The above techniques for protecting data on a computer readable medium against unauthorised use may be thought of as active, in the sense that they rely on monitoring and controlling such use in real time. It is, of course, possible according to the invention to combine such active techniques with the passive techniques described above in relation to the prior art.

The invention may also comprise a hook driver for enabling the device driver to hook into the device-driver stack for the media drive.

Advantageously, the invention also includes a fingerprint reader for checking the computer readable medium on insertion into the media drive to establish whether it carries a fingerprint indicating that the medium is protected against copying. If not, the invention preferably allows data transfer without performing any monitoring or evaluation.

BRIEF DESCRIPTION OF THE DRAWINGS

The invention is described further, by way of example only, with reference to the accompanying drawings, in which.

DETAILED DESCRIPTION OF PREFERRED EMBODIMENTS

Figure 1:
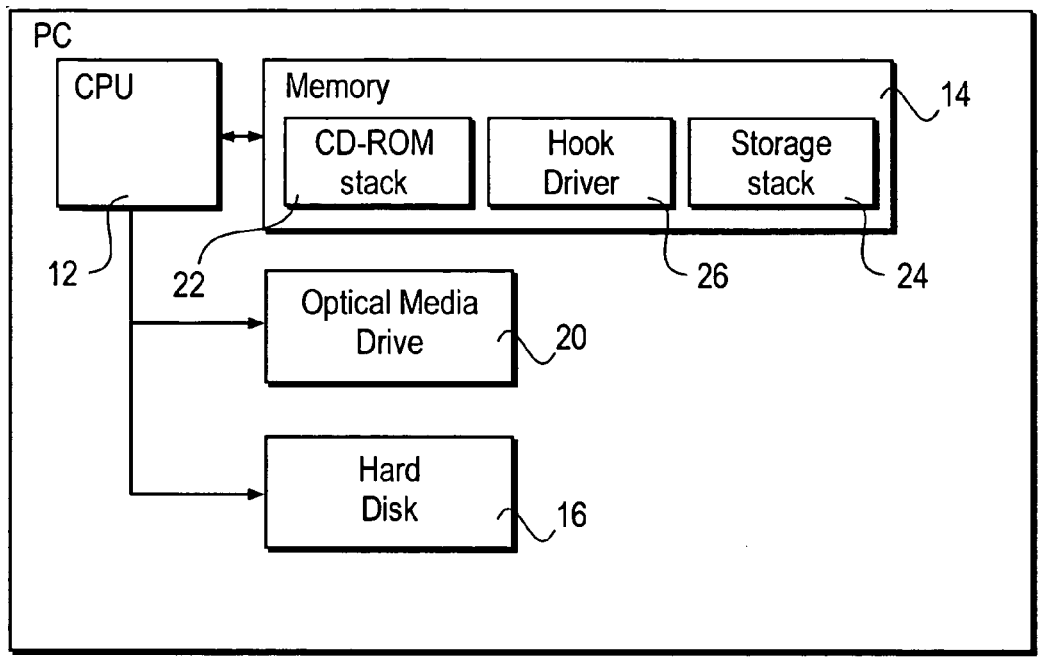
FIG. 1 is a block diagram of a computer incorporating the present invention.

The invention will now be described with reference to a number of preferred embodiments illustrated in the drawings. The invention may be employed in a personal computer, a computer system comprising a local area network (LAN) or a computer network comprising a wide area network (WAN), such as the Internet. The principles are the same in each case, and therefore only the application of the invention in a personal computer will be described. Such an application is illustrated in FIGS. 1 to 4, which illustrate the basic hardware employed in the present invention and the corresponding architecture.

Figure 2:
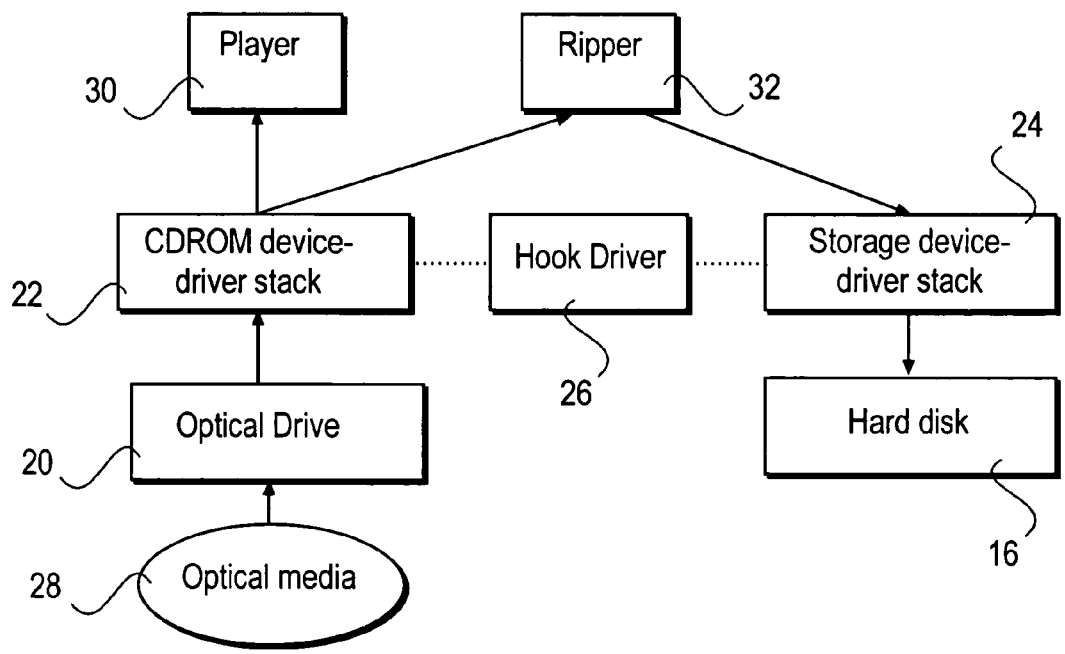
FIG. 2 is a block diagram showing further details of the computer of FIG. 1.

Referring initially to FIGS. 1 and 2, a personal computer 10 includes a central processing unit (CPU) 12, a memory 14, and a hard disk 16. The computer 10 also includes at least one media drive 20 for a computer readable medium such as an optical disc, for example a CD or a DVD. Stored in the memory 14 is the application software for providing instructions to the CPU 12 for a variety of functions. In particular, a first such function 22 comprises a device driver stack for controlling reading and writing with respect to a computer readable medium, in this instance an optical disc, loaded in the media drive 20. A second function 24 is a storage device driver stack for controlling reading and writing in relation to the hard disk 16 of the computer 10. In addition, a further function 26 is stored in the memory 14, which comprises a device driver according to the invention. This device driver 26 is termed a 'hook driver' herein because, in use of the invention, it hooks into at least one of the device driver stack 22 and the storage device driver stack 24 in order to perform a monitoring function as will be described below.

According to the invention, the hook driver 26 detects when an optical disc 28 is inserted into the optical drive 20, and thereafter monitors the use of the optical disc 28. In particular, the hook driver 26 monitors data transfer in relation to the optical disc 28 and/or the manner in which the optical disc 28 is accessed, in order to determine whether the data on the disc is the subject of normal playback by a play application 30 or unauthorised copying by a ripping application 32. During normal playback, the information is read from the optical disc 28 by the player 30 by way of the device driver stack 22 for output by way of speakers and/or a display. During ripping, however, data read from the optical disc 28 is copied by means of the ripper 32 and is transferred by means of the storage device driver stack 24 to the local hard disk 16. On detection of ripping by the ripper 32, the hook driver 26 takes steps to prohibit access by the ripper 32 to the optical disc 28 and/or to prevent further copying of data from the optical disc 28.

Figure 3:
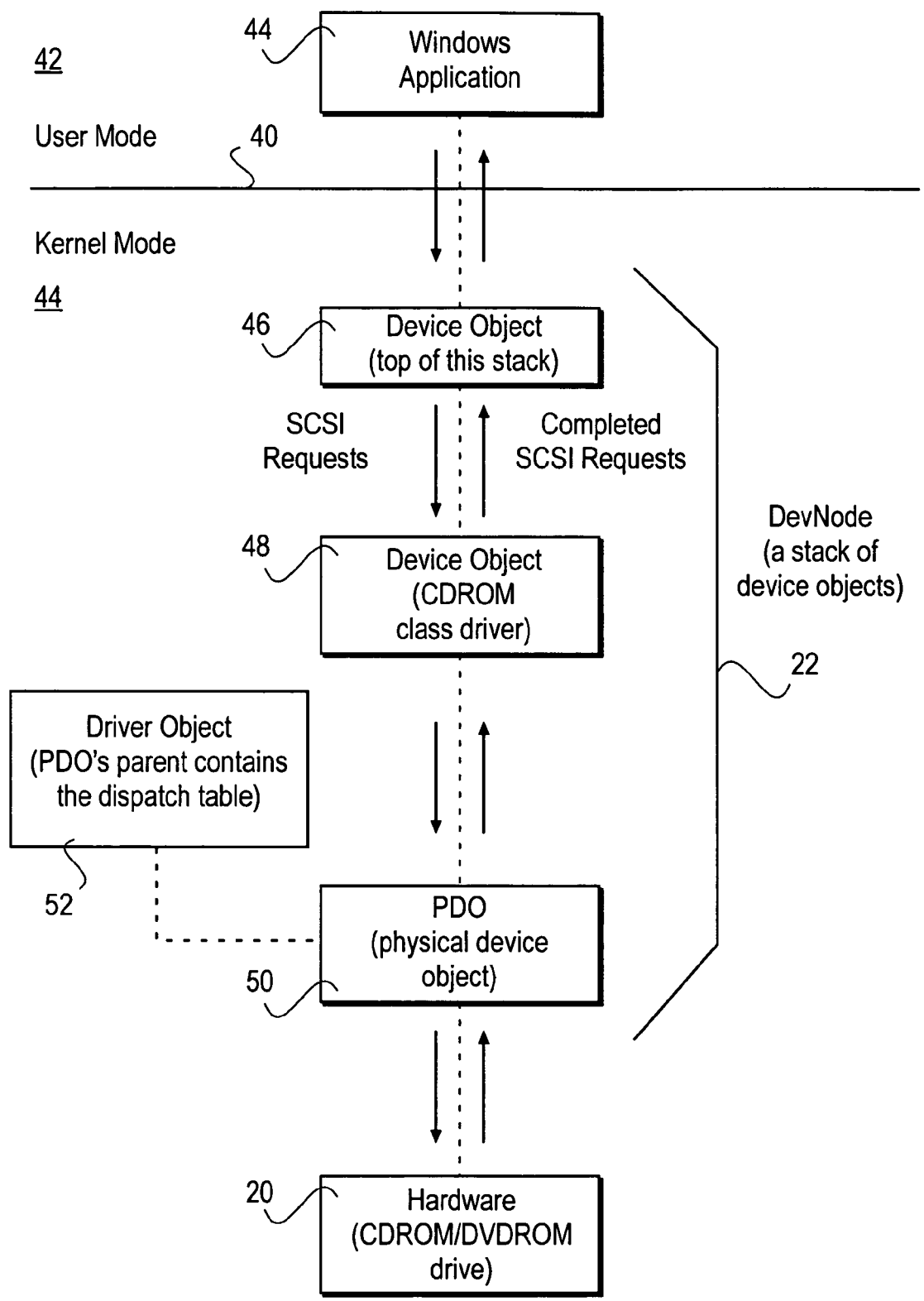
FIG. 3 is a diagram of a device driver stack of FIG. 2, showing a normal flow of information and a relationship between the stack and a hook driver according to the present invention.

FIG. 3 shows details of the device driver stack 22 and the connection between the hook driver 26 and the device driver stack 22. As shown in FIG. 3, the device driver stack 22 is situated at an interface 40 between a user mode 42 of the computer 10 and a kernel mode 44. The user mode handles high level activities, such as the implementation of applications in the computer, including for example a Windows application 44, the play application 30 or other applications required by the computer user. The kernel mode 44 handles low level activities, such as the scheduling of tasks, and interfacing with drivers etc.

The interface 40 is known as a small computer system interface (SCSI) and serves for example to connect hardware, such as the optical drive 20, by way of the device driver stack 22 to the CPU 12 within the computer 10. Requests, known as SCSI requests, from the Windows or other application 44 to the optical drive 20 are transmitted across the interface 40 and through a series of layers in the device driver stack 22, which increasingly convert the requests from a high level software language to instructions applicable to the physical hardware in the form of the optical drive 20, for implementation at the optical drive 20. Completed SCSI requests are then transmitted in the reverse direction through the device driver stack 22 and across the interface 40 to the Windows application 44 for processing in the CPU 12.

As shown in FIG. 3, the device driver stack includes three layers in the form of a high level device object 46, a further device object 48, comprising in this instance a CD-ROM class driver, and a physical device object 50 for converting the instructions from the CD-ROM class driver 48 into signals for application to the optical drive 20. The hook driver 26 is represented in FIG. 3 as a driver object 52, which hooks into the physical device object 50 at the lowest access point of the device driver stack 22, in other words at the level of the device driver stack 22 which interfaces with the hardware comprising the optical drive 20. The reason for situating the hook driver 26 (the driver object 52) as low as possible in relation to the device driver stack 22 is in order to intercept requests or commands from all of the applications and processes that may wish to read the optical disc 28 in the optical drive 20. Were the hook driver 26 to be situated at a higher level in relation to the device driver stack 22, it is possible that certain requests and commands could be arranged to bypass the hook driver 26 and thereby to circumvent the monitoring function provided by the hook driver 26.

Figure 4:
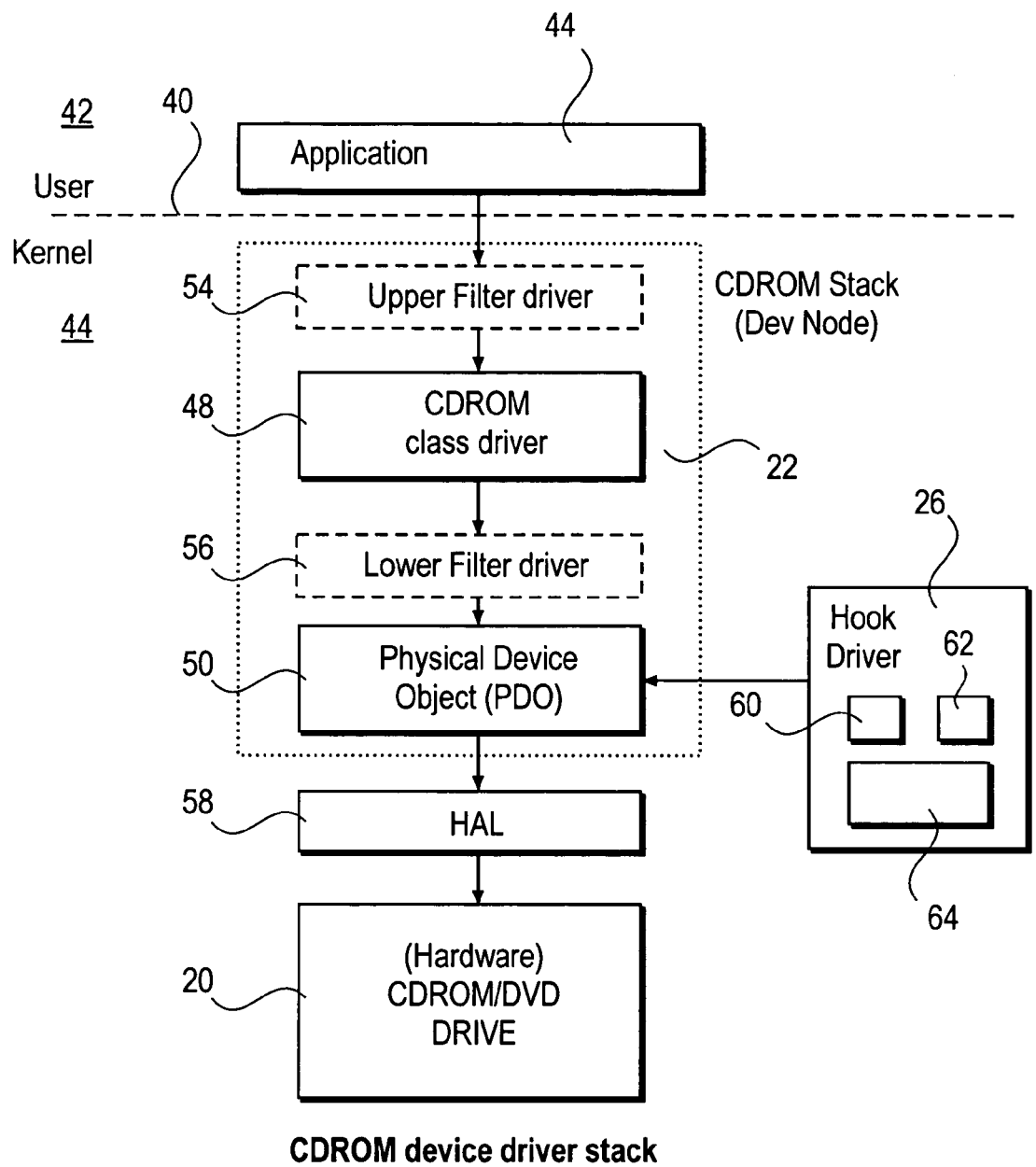
FIG. 4 is a further view of the device driver stack and hook driver of FIG. 3.

FIG. 4 is a further view showing a slightly different representation of the device driver stack 22 situated at the SCSI interface 40 separating the user 42 and the kernel 44 of the computer 10 and arranged to receive requests from the application 44. In this instance, the device driver stack 22 includes the CD-ROM class driver 48 located between upper and lower filter drivers 54, 56 respectively. The lower filter driver 56 is connected to the physical device object 50, which applies requests to the optical drive 20 by way of a hardware abstraction layer (HAL) 58. The HAL 58 serves for abstracting hardware signals from the requests received from the physical device object 50 and applying them to the optical drive 20 and for converting signals received from the optical drive 20 into completed requests for transmission back to the physical device object 50.

The hook driver 26 as shown is hooked in to the physical device object 50 of the device driver stack 22, and includes a hook manager 60 for effecting the connection between the hook driver 26 and the physical device object 50, a fingerprint reader 62, and an authentication object 64. Further details of the hook manager 60, the fingerprint reader 62 and the authentication object 64 will now be described with reference to FIGS. 5 to 7, which show flowcharts representing the steps performed by each of these objects.

Figure 5:
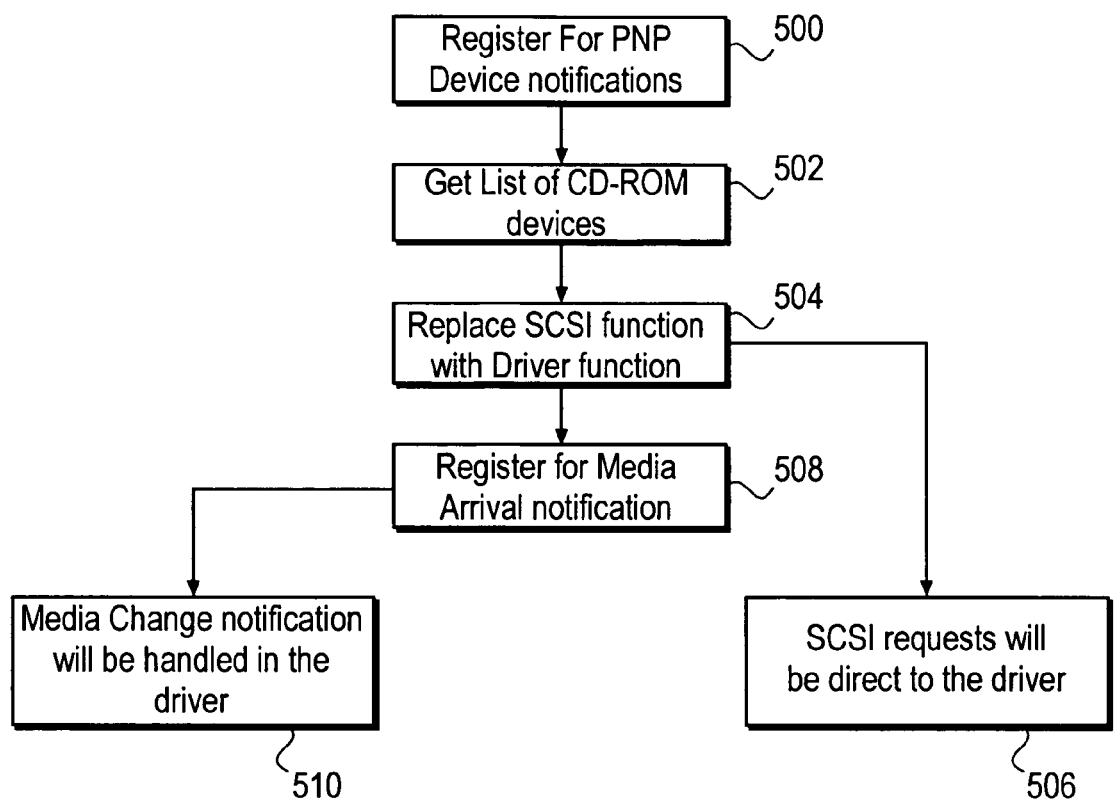
FIG. 5 is a flowchart showing the steps of a hook manager for the hook driver for hooking the hook driver into the device driver stack.

FIG. 5 is a flowchart representing the operations of the hook manager 60, which are as follows. In step 500, the hook driver 26 accesses the physical device object 50 and registers itself for receiving notifications of plug and play (PNP) devices incorporated within the computer 10 or connected to the computer 10 as peripherals. Such PNP devices include the optical drive 20. Next, in step 502, the hook driver 26 requests from the operating system of the computer 10 and obtains a list of such devices currently present, including the optical drive 20. The request for notification of PNP devices in step 502 remains active, and as further devices are connected into the computer 10 the IDs for such devices will be supplied to the hook driver 26. Having obtained the current list of PNP devices in step 502, the hook driver 26 in step 504 substitutes its own function for the normal SCSI function provided by the physical device object 50. All future SCSI requests will therefore pass through the hook driver 26. Thus, all future SCSI requests for supply to the optical drive 20 will be directed through the hook driver 26 as shown in step 506. In addition, in step 508, the hook driver 26 registers itself with the application 44 for receiving notification of media arrivals, i.e. notification that an optical disc 28 has been inserted in the optical drive 20. Such notifications are now handled by the hook driver 26 as indicated by step 510. The installation of the hook driver 26 is now complete.

Figure 6:
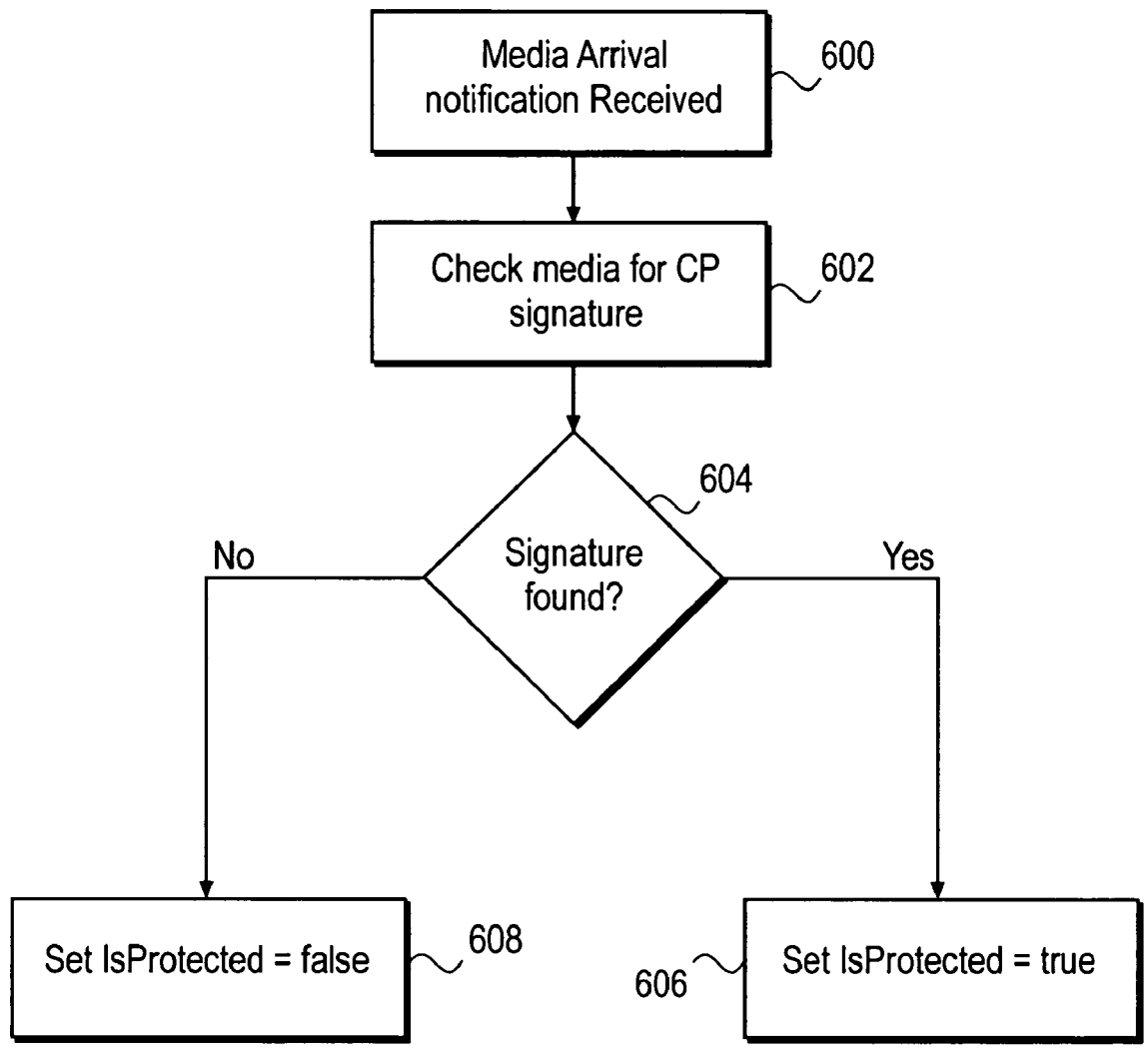
FIG. 6 is a flowchart showing the steps of a fingerprint reader of the hook driver for reading a fingerprint on an optical disc inserted into a media drive of the computer.

FIG. 6 shows details of the steps involved in the sub-routine 510 in FIG. 5. When a notification is received in step 600 that a new optical disc 28 has been inserted in the optical drive 20, the hook driver checks the optical disc for a content protection (CP) signature or fingerprint in step 602. The hook driver 26 enquires in step 604 whether a fingerprint has been found and, if the answer if yes, sets a flag "Is protected" to true in step 606. If the answer to the enquiry of step 604 is no, the hook driver sets the flag to "false" in step 608.

A first embodiment of the authentication device 64 will now be described with reference to FIG. 7. The present embodiment of authentication device 64 is based on the assumption that the transfer of large volumes of data signifies that ripping is taking place rather than normal playback. For example, such large volumes of data could be in the range of 10 megabytes to 10 gigabytes.

Figure 7:
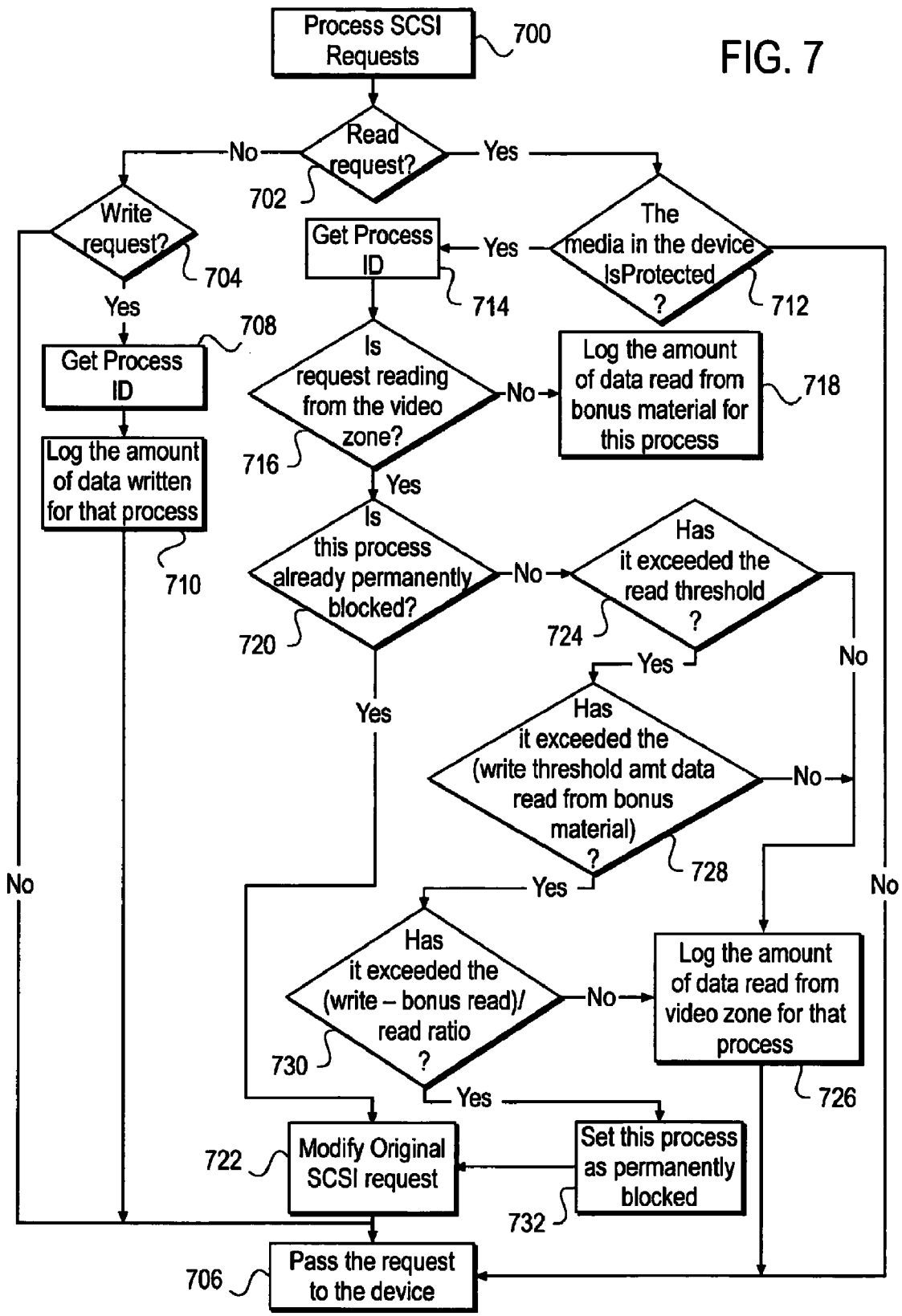
FIG. 7 is a flowchart representing steps for data transfer authentication according to a first embodiment of the hook driver for evaluating volumes of data transfer from an optical disc.

As shown in FIG. 7, in step 700, requests that hitherto would have been processed in the device driver stack 22 are now received by the hook driver 26. In step 702, the hook driver 26 enquires whether the request that has been received is a read request. If the answer is no, the hook driver proceeds to step 704 and enquires whether the request is a write request. In the event that the answer is again no, the hook driver 26 simply forwards the request to the optical drive 20 in step 706. If the answer to the enquiry in step 704 is yes, signifying that the process is intending to write data of any kind to the hard disk 16, the hook driver 26 proceeds to step 708 and obtains the ID for the process. Next, in step 710, the hook driver 26 begins logging in a write data log the amount of data written by the process and proceeds again to step 706.

Reverting to step 702, if the answer to the enquiry in this step is yes, namely that the request received by the hook driver 26 is a read request, the hook driver 26 proceeds to step 712 and checks whether the optical disc 28 inserted in the optical drive 20 is protected against copying, by reviewing the flag generated in step 606 or step 608 of the sequence of FIG. 6. If the optical disc 28 is not protected, the hook driver 26 once again proceeds to step 706 and simply passes the SCSI request directly to the optical drive 20. On the other hand, if the optical disc 28 is protected, the hook driver 26 proceeds to step 714 and obtains the ID of the process that intends to use the optical disc 28. Next, in step 716, the hook driver 26 enquires whether the process is now reading video data from the video zone of the optical disc 28. If not, the hook driver 26 assumes that the process is reading what is known as bonus material on the optical disc 28, ie advertising, promotional or other such material that is not restricted against copying, and in step 718 begins logging in a read bonus material data log the amount of data being read from such bonus material. A valid player may copy the bonus material before starting normal playback and it is important not to block such activity. The hook driver then proceeds to step 706.

If, in step 716, it is established that the process is reading video data from the video zone of the optical disc 28, the hook driver 26 next checks in step 720 whether the process is already permanently blocked (as will be described), and in the event that the response is a yes proceeds directly to step 722. If the response to the enquiry of step 720 is a no indicating that the process is not blocked, the hook driver 26 proceeds instead to step 724 and enquires whether the process reading from the optical disc 28 has exceeded a read threshold for the video data read from the video zone of the optical disc 28, suggesting that large volumes of data are being transferred. The hook driver 26 checks a video data log for this purpose. If the answer is no, the hook driver 26 simply logs in the video data log in step 726 the amount of data read from the video zone and proceeds to step 706.

However, if the hook driver 26 establishes in step 724 that the read threshold has been exceeded, it proceeds to step 728 and reviews the logs already mentioned for the write data and for the read bonus material data and enquires whether a second threshold derived from these logs has been exceeded. This second threshold is set to be the difference of a write threshold for write data in the write data log and a read threshold for the amount of read bonus material data in the read bonus material data log, and signifies that a given greater amount of data has been written by the process to the hard disk 16 than relates simply to the bonus material. Thus, this second threshold effectively represents a video data write threshold. If the answer to the enquiry of step 728 is no, the hook driver 26 proceeds to step 726 and logs in the video data log the amount of data read from the video zone.

On the other hand, if the answer to the enquiry of step 728 is yes, the hook driver 26 proceeds to step 730 and enquires whether a threshold ratio has been exceeded. This threshold ratio is the ratio of the difference of the current amount of write data in the write data log and the current amount of bonus material data read in the read bonus material data log to the current amount of data in the video data log, and signifies that the amount of video data being written is sufficient to indicate ripping rather than merely, for example, analysis of the video material on the optical disc 28. If the answer to the enquiry of step 730 is yes, the hook driver again proceeds to step 732 and sets a flag indicating the process is permanently blocked. If the answer to the enquiry of step 730 is no, the hook driver 26 proceeds to step 726 and logs the amount of video data read from the video zone of the optical disc 28.

After setting the process blocked flag in step 732, the hook driver 26 next proceeds to step 722 and modifies the original SCSI request before passing it to the optical drive 20 in step 706.

The assumption here is that in the event of ripping, the volume of data transferred will exceed both a read threshold and a write threshold whereas, in the event of normal playback, the read threshold may be exceeded but the write threshold will not be exceeded. Therefore, if the answer to the enquiry of step 728 is a yes, indicating that the video data write threshold has been exceeded, the hook driver 26 sets the flag "blocked equals true" for the current process. This flag indicates that in the view of the hook driver 26, a ripping operation is taking place rather than normal playback and so the hook driver then modifies the SCSI request in step 722. Likewise, if the hook driver 26 discovers in step 732 that the ratio of read threshold to the difference of the write threshold and the amount of bonus data read has been exceeded, it again sets the flag "blocked equals true" and modifies the original SCSI request on the assumption that ripping is taking place. Such modification may involve for example preventing the identified process from having further access to the optical disc 28 in the optical drive 20 or preventing further copying from the optical disc 28 by preventing further writing or rendering the returned data useless.

In order to ensure the accuracy of the authentication and prevent a false assessment of ripping, the read and write thresholds are set at a relatively high level. This means that a certain amount of data may be copied before a decision is taken to prevent further copying, and for example several tens of megabytes may have been transferred between the optical drive 20 and the target storage device 16 by the time that ripping is detected. However, for a typical DVD 100 megabytes still represents only about 3 minutes of content and permitting a user to rip this amount of copy protected video material is not significant in terms of the overall length of video content on the DVD, especially if it ensures that the hook driver 26 does not interfere with normal playback.

It will be appreciated from the description of the embodiment shown in FIG. 7 that the hook driver 26 will effectively be invisible to SCSI requests unless the optical disc 28 includes a fingerprint indicating that it is protected against copying and, in addition, a write process exceeds a predetermined write threshold.

Figure 11:
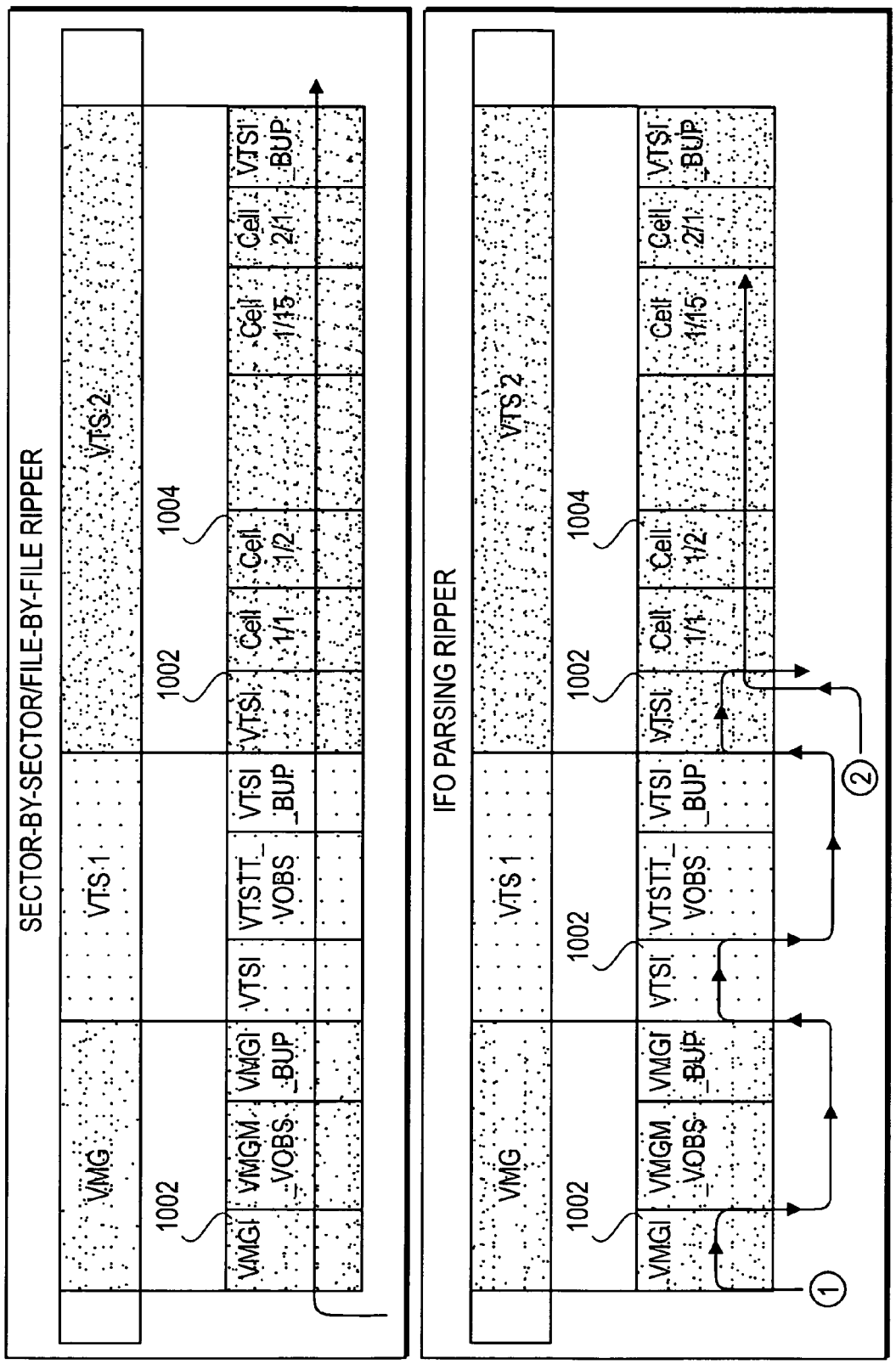
Figure 12:
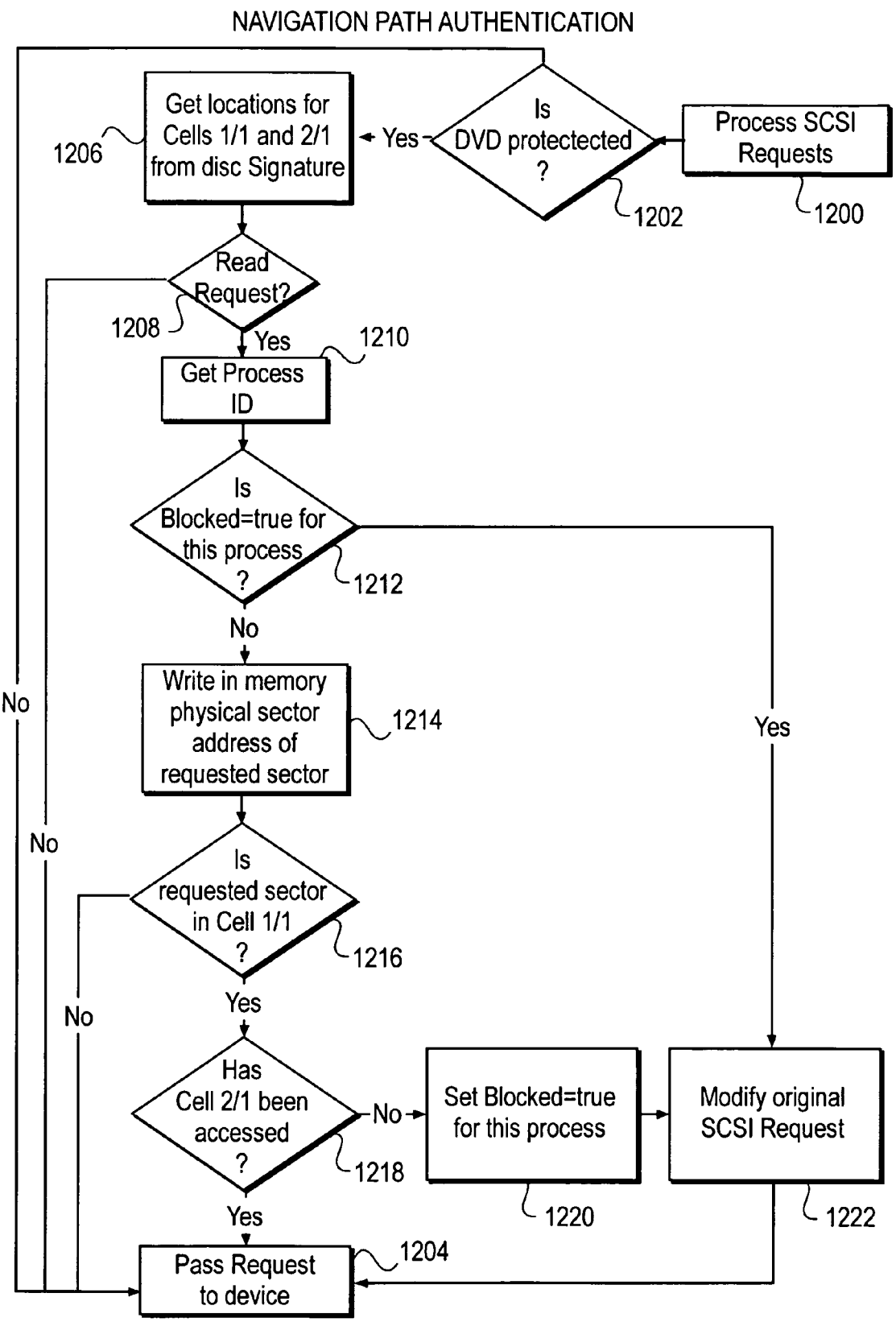
FIG. 12 is a flowchart showing the steps for navigation path authentication according to a second embodiment of the hook driver based on evaluating the navigation path.

A second embodiment of authentication device 64 is illustrated in FIG. 12 and is based on an evaluation of a navigation path employed during the reading of data on the optical disc 28. In order to appreciate this embodiment, it is necessary to understand the data structure provided on an optical disc 28, and also the navigation paths that will be employed for reading the data on the optical disc 28. Therefore, a particular example of the structure of data provided on a DVD will be described first with reference to FIGS. 8 and 9, and the navigation paths taken respectively by a legitimate player 30 and by two different kinds of ripper 32 for such a data structure will be described. next with reference to FIGS. 10 and 11.

Figure 8:
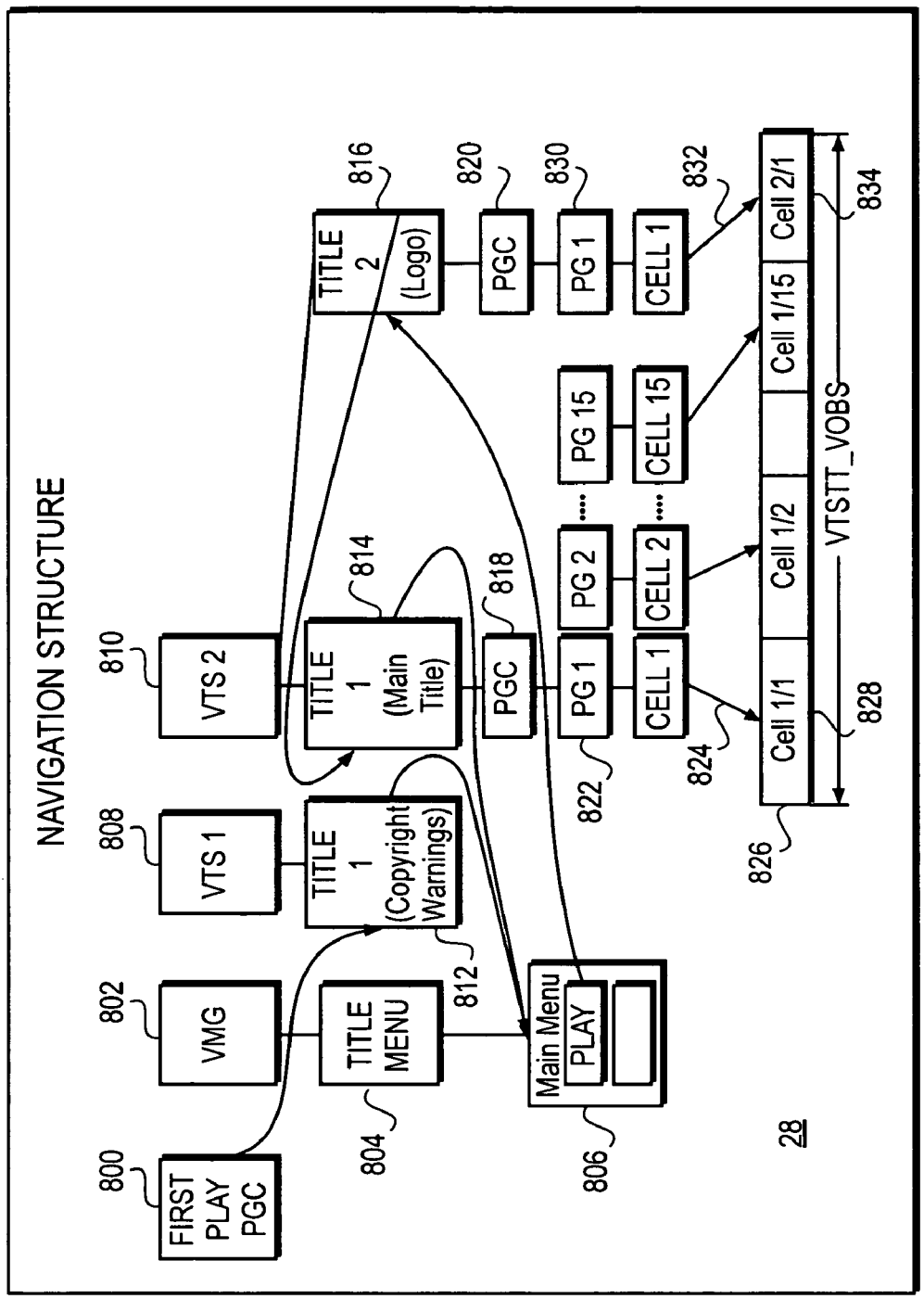
FIG. 8 shows the navigation structure of data on an optical disc.

Referring first to FIG. 8, the data provided on a DVD comprises control data for managing reading of the DVD, ie for determining the navigation path for reading the data on the DVD, and content data comprising the main content on the DVD. The DVD 28 shown in FIG. 8 is a simple video DVD including an initial program chain (PGC) 800, which is normally played first and which indicates the navigation path to be followed. A video manager (VMG) 802 contains various information data and includes a title menu 804 having a main menu 806. The DVD also includes two video title sets (VTSs) 808 and 810, each again including information files. VTS1 808 includes a single title 812 containing the usual copyright warnings. VTS2 810 includes a first title 814 comprising the title for a main movie on the DVD and a second title 816 comprising a title for a short video clip, such as a logo, or for a couple of frames of silent black video.

Each of the titles 814, 816 includes one or more program chains (PGCs) 818, 820 respectively. The PGC 818 of title 814 includes a number of individual programs 822, such as PG1, PG2 etc. . . . , which are typically arranged to be played in sequence. Each of the programs 822 has at least one pointer 824 addressing a particular part of a corresponding video object set 826. Each video object set 826 is divided into a number of cells 828, such as cell 1/1, cell 1/2 etc. . . . Likewise, the program chain 820 also has a program 830, such as PG1, having a pointer 832 to a particular part of the video object set 826, in this instance to a cell 834, such as cell 2/1.

Figure 9:
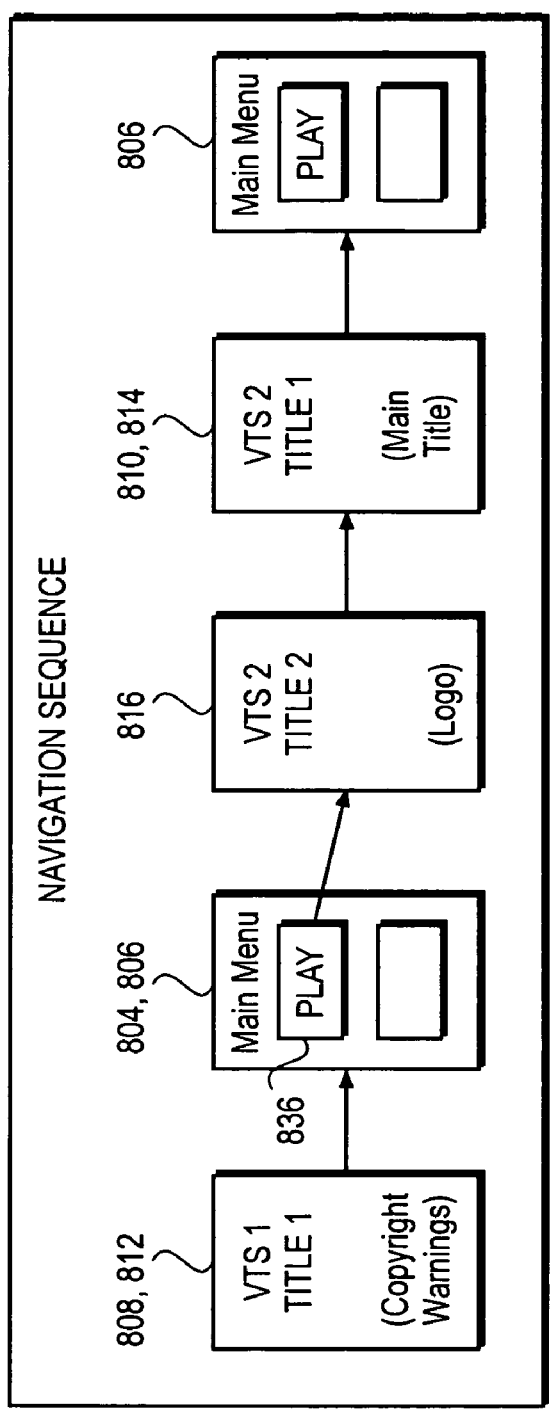
FIG. 9 shows the navigation sequence resulting from the navigation structure of FIG. 8.

The navigation sequence resulting from the navigation structure of FIG. 8 is shown in FIG. 9. After loading the DVD 28 into the optical drive 20, VTS1 808 and title 812 including the copyright warnings are presented first. After this, the main menu 806 of the main title 804 is presented, and if a play button 836 on the main menu 806 is activated, the navigation sequence proceeds to the title 816 in VTS2 810 and the logo or other content included in cell 834. Next, the navigation sequence proceeds to the title 814 and plays the main content or movie of the DVD, following which the navigation sequence reverts to the main menu 806.

It is to be noted from FIG. 8 that the presentation data for the title 816 is physically located on the DVD 28 after the presentation data for the main title 814. Thus, as shown in FIG. 9, a legitimate player 30 will first access the presentation data for title 816 by accessing cell 834 at the end of the video object set 826 and will then jump back to a previous physical location on the DVD 28 to access the presentation data for the main title 814 by accessing the cells 828 of the video object set 826. By contrast, a ripper would access the different files on the DVD in a linear manner or would access the information files first and then, after selecting the main title, would access the presentation data for the main title. Furthermore, a ripper would access the presentation data for the main title 814 before the presentation data for title 816. This may best be understood from FIGS. 10 and 11.

Figure 10:
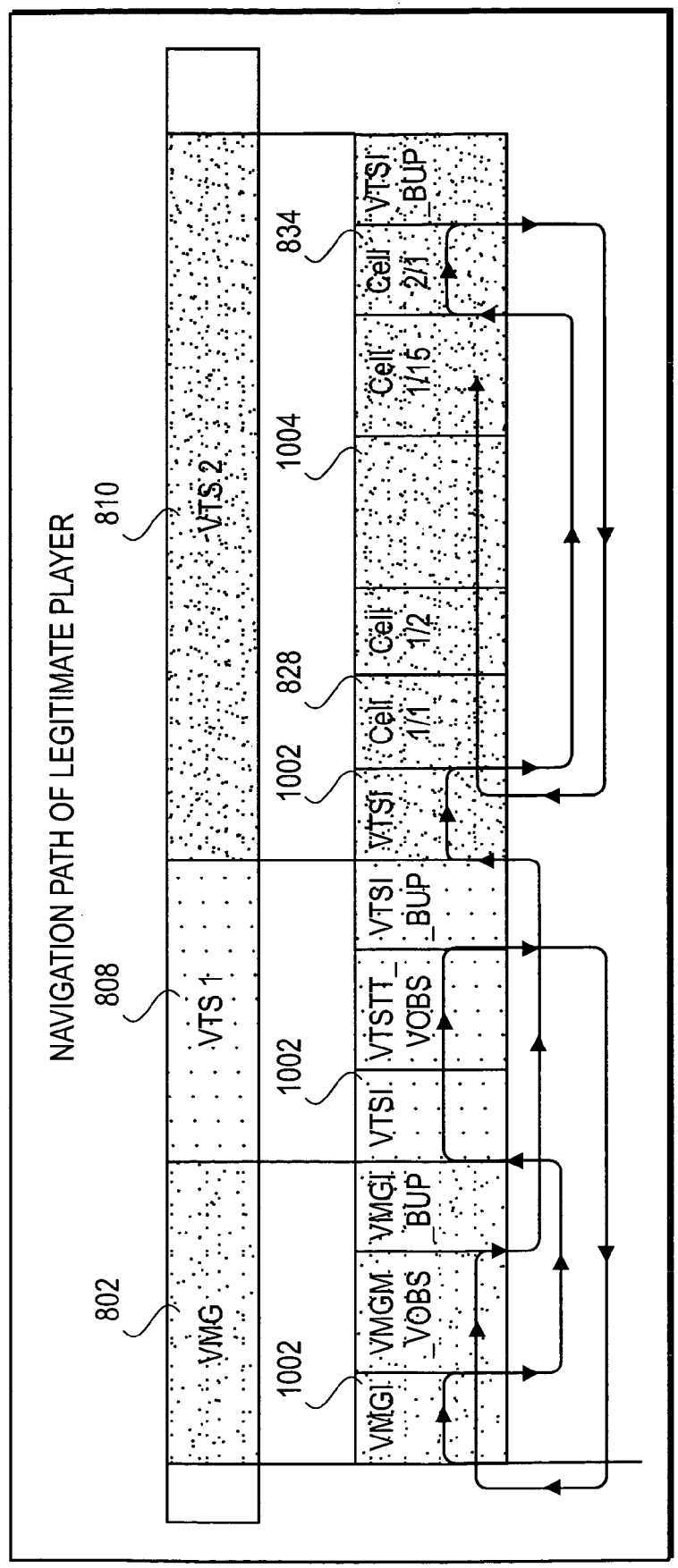
FIGS. 10 and 11 show respectively the navigation path for a legitimate player and the navigation paths for two different kinds of ripper in relation to the navigation structure of FIG. 8.

FIG. 10 shows the navigation path of a legitimate player 30, indicating how the information files containing respectively the control data or navigation information and the content data or video information are accessed by the player. As shown, the player 30 first accesses the control data or navigation information 1002 in the VMG 802, and then VTS1 808, the VMGM_VOBS within the VMG 802 and finally VTS2 810, according to the navigation path defined by the navigation structure on the DVD Video shown in FIG. 9. When accessing VTS2 810, the player is directed first to the video object 834 comprising the cell 2/1 and next to the video objects 828 comprising the cells 1/1, 1/2 etc.

Turning to FIG. 11, this shows the navigation paths taken respectively by a first ripper 32 accessing the DVD sector by sector or file by file and a second ripper 32 accessing the information files to obtain the title information first and then accessing the content data for the title selected for ripping, supposedly the main title. Such a ripper is known as an "IFO parsing" ripper. As shown in FIG. 11, the sector by sector or file by file ripper 32 simply works its way through all of the files of the video manager 802, the VTS1 808 and the VTS2 810 in physical sequence on the DVD. By contrast, the IFO parsing ripper 32 accesses first the control data 1002 of each of the video manager 802 and the VTS1 and VTS2 808, 810, and then proceeds next to access the video object 828 for the main title 814. In both cases, the ripper 32 follows an entirely different navigation path from that of the legitimate player 30 and accesses the video object 834 comprising the cell 2/1 after accessing the video object 828 comprising cells 1/1, 1/2 etc. . . . or does not access the video object 834 at all.

The second embodiment of authentication device 64 illustrated in FIG. 12 serves for monitoring such deviations in navigation path and for controlling access to the DVD accordingly. This embodiment is based on the data and navigation structures shown in FIGS. 8 to 11.

The second embodiment of authentication device 64 shown in FIG. 12 monitors access to the video objects 828, 834 of the DVD 28 in order to check for ripping. The hook driver 26 receives SCSI requests in step 1200 and in step 1202 enquires whether the DVD is copy protected. If the answer is no, the hook driver 26 simply forwards the SCSI request to the optical drive 20 in step 1204. On the other hand, if it is established that the DVD is copy protected, the hook driver 26 proceeds to step 1206 and from the disc fingerprint establishes that the video object 834, comprising cell 2/1, should be read before the video object 828, comprising cells 1/1, 1/2 etc., and obtains the locations for cell 1/1 and cell 2/1.

Next, the hook driver 26 proceeds to step 1208 and enquires whether the SCSI request that has been received is a read request. If the answer is no, the hook driver 26 proceeds to step 1204 and simply forwards the request to the optical drive 20 as before. If, however, the answer is a yes, the hook driver 26 obtains the ID for the process intending to use the DVD 28 in step 1210. The hook driver 26 proceeds to step 1212 and checks whether the flag "blocked equals true" has already been set for this process. If the answer is no, the hook driver 26 proceeds to step 1214 and writes in the memory 14 the physical sector address of the disc sector requested in the read request and the process ID for the process from which the SCSI request originated. The hook driver 26 then proceeds to step 1216 and checks whether the requested sector was in cell 1/1. If the answer is no, the hook driver simply passes the request to the optical drive 20 in step 1204 as before. If, on the other hand, the answer to the enquiry of step 1216 is yes, the hook driver 26 enquires in step 1218 whether cell 2/1 has already been accessed. If the answer is yes, once again the hook driver 26 simply forwards the request to the optical drive 20 in step 1204. However, if the answer to the enquiry in step 1218 is no, indicating that the current read request has endeavoured to access cell 1/1 without first accessing cell 2/1, then the hook driver sets the flag "blocked equals true" for the present process in step 1220. When the flag "blocked equals true" is set, either as established in step 1212 or as the outcome of step 1220, the hook driver 26 proceeds to step 1222 and modifies the original SCSI request, for example to prevent further access to the DVD or to prevent copying from the DVD 28, before passing the modified request to the optical drive 20 in step 1204.

The embodiment of authentication device shown in FIG. 12 is designed to detect both sector by sector/file by file rippers and IFO parsing rippers, neither of which would access cell 2/1 before cell 1/1 within VTS2 810. It is of course to be appreciated that the authentication device 64 of FIG. 12 is based on a particular example of DVD given in FIGS. 8 to 11, and that it would be appropriately modified in any instance to suit the particular data and navigation structures on a particular optical disc. It is also to be appreciated that alternative navigation path authentication structures are possible.

Figure 13:
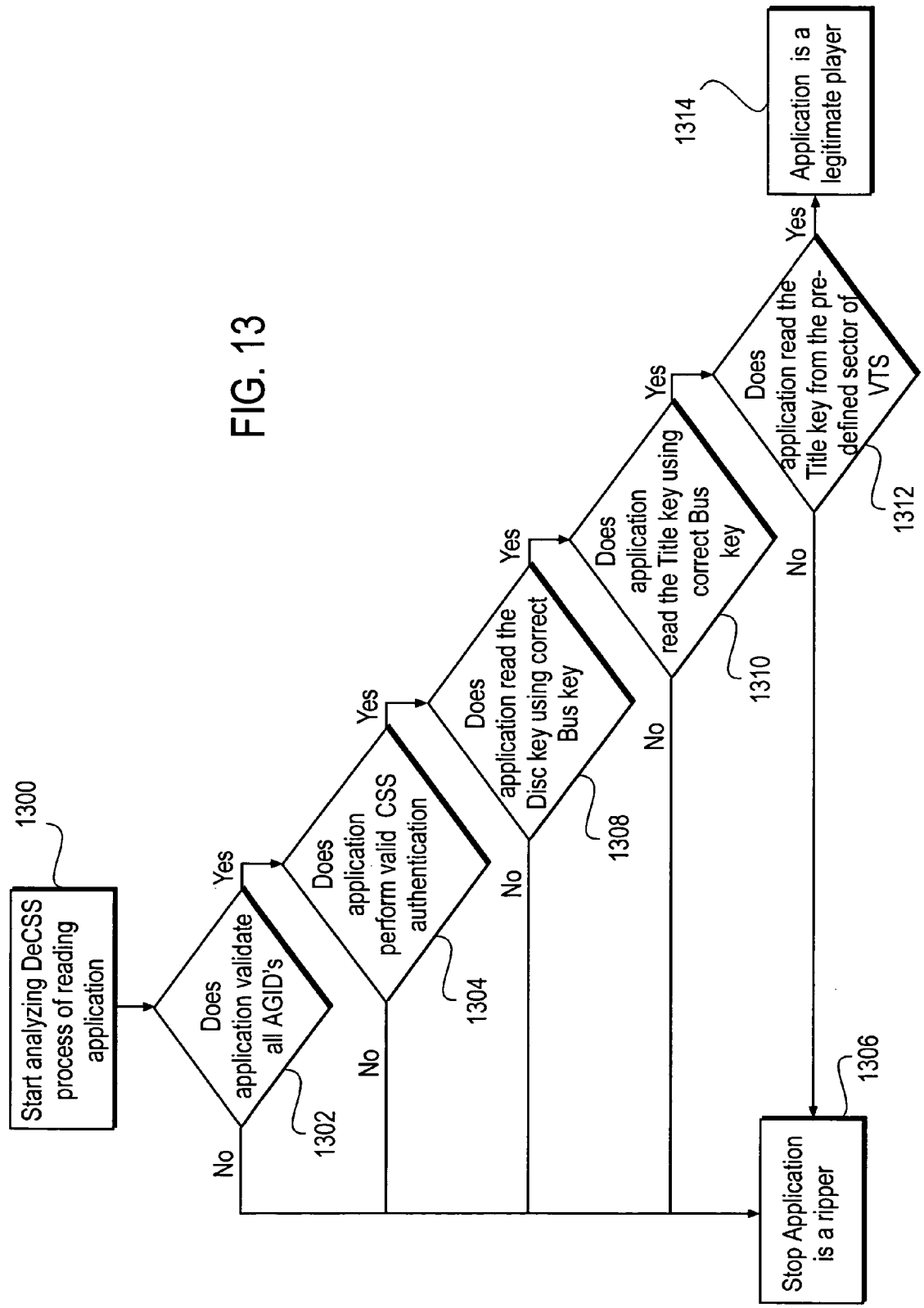
FIG. 13 is a flowchart showing authentication steps for a third embodiment of hook driver employing content scrambling system (CSS) decryption.

A third embodiment of authentication device 64 is shown in FIG. 13 and is designed for detecting whether the correct navigation path on an optical disc 28 is employed, based on the decryption of content scrambling system (CSS) keys possessed by both the player 30 and the optical disc 28 for encrypting information for controlling playback of the optical disc 28. The process starts in step 1300 when the hook driver 26 starts to monitor the way in which CSS decryption is performed in response to a read or write request from the user application 44. For simplicity, it will be assumed that the request is a read request but the process would be similar in the case of a write request. The hook driver 26 proceeds to step 1302 and enquires whether the application 44 validates a complete set of authentication grant IDs (AGIDs) for authenticating a player 30 for video playback. If the answer is yes, the hook driver 26 proceeds to step 1304, but if the answer is no, the hook driver stops the reading process in step 1306 on the assumption that ripping is taking place. In step 1304, the hook driver 26 enquires whether the application is performing a valid CSS authentication. If the answer is no, the application proceeds again to step 1306. However, if the answer is yes, the hook driver 26 proceeds to step 1308 and enquires whether the application is reading a playback authentication key provided on the optical disc 28 using a correct bus key provided in the playback software. If the answer is no, the hook driver 26 advances to step 1306 and if the answer is yes the hook driver proceeds to step 1310. In step 1310, the hook driver 26 enquires whether the application is reading a title key on the optical disc 28 representing the video title using the correct bus key in the playback software. If the answer is no, the hook driver 26 advances to step 1306 and if the answer if yes, the hook driver 26 proceeds to step 1312. Here, the hook driver 26 checks whether the application reads the title key from the correct sector of the optical disc 28. Again, if the answer is no, the hook driver 26 advances to step 1306. On the other hand, if the answer to step 1312 is yes, the hook driver 26 assumes that the player 30 is a legitimate user in step 1314 and allows playback to continue.

Figure 14:
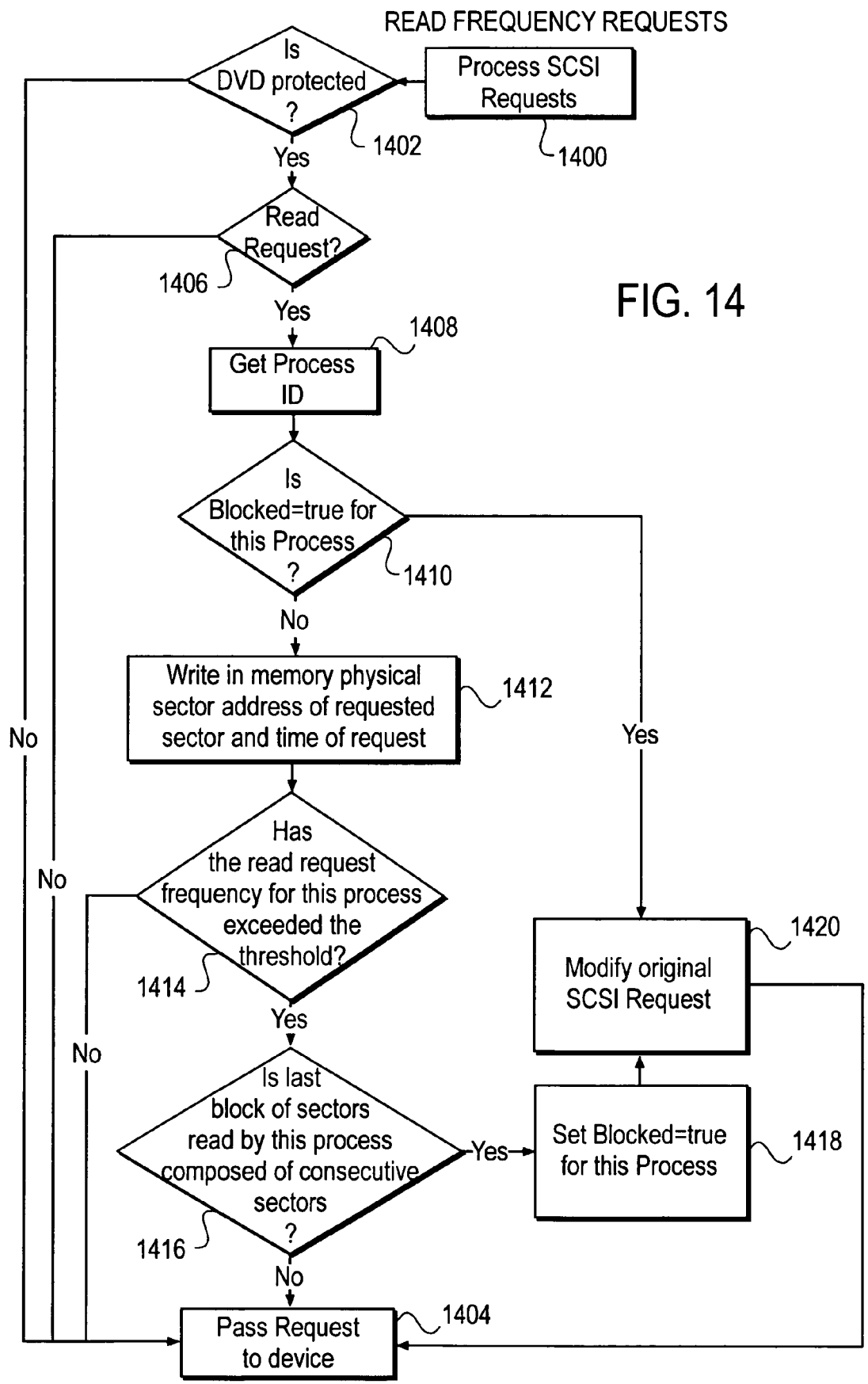
FIG. 14 is a flowchart representing steps for data transfer authentication according to a fourth embodiment of hook driver for evaluating frequency of data transfer from an optical disc.

A fourth embodiment of authentication device is shown in FIG. 14 for monitoring the frequency of the reading requests sent to the optical drive 20 and for controlling access to the optical disc 28 accordingly. In this fourth embodiment, the hook driver 26 receives SCSI requests in step 1400, and in step 1402 checks the fingerprint on the optical disc 28 and establishes whether the disc is copy protected. If the answer is no, the hook driver 26 simply forwards the request to the optical drive 20 in step 1404. If, however, the answer is a yes, the hook driver 26 proceeds to step 1406 and enquires whether the SCSI request is a read request. If no, the hook driver 26 forwards the request to the optical drive 20 by way of step 1404 as before. If the outcome of step 1406 indicates that a read request has been received, the hook driver 26 proceeds to step 1408 and obtains the ID for the process intending to use the optical media 28.

Next, in step 1410, the hook driver 26 enquires whether the flag "blocked equals true" has already been set for this particular process. The hook driver 26 proceeds to step 1420 if it notes that the flag "blocked equals true" is set for the present process. If the answer to step 1410 is no, the hook driver 26 proceeds to step 1412 and writes in the memory 14 the physical sector address of the sector on the optical disc 28 which has been requested in the read request, as well as the time of the request. The hook driver 26 proceeds to step 1414 and checks from the recorded times of previous read requests whether the read request frequency for this process has exceeded a frequency threshold. If the answer is no, the hook driver 26 passes the read request to the optical drive 20 by way of step 1404. If the answer is yes, on the other hand, the hook driver 26 verifies in step 1416 whether the last block of sectors read by the present process is composed of consecutive sectors. If the answer is no, the hook driver 26 proceeds to step 1404 and forwards the request to the optical drive 20. However, if the answer is yes, the hook driver 26 sets the flag "blocked equals true" for the present process in step 1418 and proceeds to step 1420. In step 1420, the hook driver 26 modifies the original SCSI request, for example either to prevent further access to the optical disc 28 or to prevent further copying of the optical disc 28, and then passes the modified request to the optical drive 20 by way of step 1404.

The fourth embodiment shown in FIG. 14 is based on the assumption that a legitimate player 30 reads sectors on the optical disc 28 at a rate designed to maintain sufficient information in its playback buffers whilst rendering video, audio and sub-picture information available for presentation to the viewer. By contrast, the ripper 32 will attempt to read each of the sectors comprising a particular cell as quickly as possible in order to shorten the ripping time. Furthermore, if a player 30 is scanning at high speed, the player will tend to skip certain sectors, whereas the ripper will typically attempt to read all the information in each cell. Therefore, by combining an evaluation of reading frequency with an evaluation of reading order, it can be established whether the reading process is that of a legitimate player 30 or that of a ripper 32.

It is possible, in a variation of the FIG. 14 embodiment, to omit the evaluation of reading order altogether and simply evaluate reading frequency. In this instance, step 1416 would be omitted from the flow sequence illustrated in FIG. 14 and instead the sequence would pass direct from step 1414 to step 1418 in the event that the enquiry of step 1414, as to whether the read request frequency threshold had been exceeded, yielded the answer yes.

Various examples of the present invention have been described above. It will be appreciated that a number of modifications are possible within the scope of the invention.

For example, although four different versions of the authentication device 64 have been discussed, it will be appreciated that other variations may be employed. Further, the described authentication devices 64 may be employed individually or in combination in any particular hook driver 26 according to the circumstances.

In the case of an authentication device 64 that monitors patterns of behaviour, such as deviations in the navigation path employed for accessing data on an optical disc 28, it will be appreciated that the described patterns may be monitored by the device 64 separately or in conjunction, or indeed in conjunction with other such patterns, to create a more sophisticated behavioural model of the device.

A particular feature of the present invention is that the hook driver 26 is effectively designed to be invisible to SCSI requests that are normally legitimate. The described embodiments are also designed to be invisible to optical media that do not possess a fingerprint indicating that the medium is copy protected.

Further, the described embodiments all check whether a newly inserted optical medium has a fingerprint indicating that the medium is to be protected against copying, and the hook driver 26 only implements its functions in those instances. It is equally possible for the invention to be employed in every case whether or not a fingerprint is present.

Furthermore, the described hook driver 26 is designed primarily to monitor reading requests, although in further embodiments it is possible for the hook driver 26 to be designed to monitor other requests instead or as well.

The embodiments described above are all for the purposes of protecting optical media against copying. It will be appreciated that the invention may alternatively or in addition have other applications. For example, once a user or process has been authenticated by the authentication device 64, the device may permit or provide access to further functions, such as a legitimate copy process or an online store offering for example soundtrack files, games or other special offers.

We claim:

1. A method for monitoring and controlling access to data on a computer readable medium, comprising:
   intercepting communications between an application program and a media drive;
   monitoring write requests issued by the application program to the media drive and logging an amount of data written to a data storage unit in response to the write requests;
   monitoring read requests issued by the application program to the media drive and logging an amount of data read from a video zone on a computer readable medium in response to the read requests;
   modifying read requests from the application program to the media drive after the logged amount of data read from the video zone exceeds a read threshold, the logged amount of data written to the data storage unit exceeds a write threshold, and a ratio including the logged amount of data written to the data storage device and the logged amount of data read from the video zone that indicates ripping is taking place; and
   sending the modified read requests to the media drive.

2. The method according to claim 1, further comprising:
   logging an amount of data read from other than the video zone on the computer readable medium in response to the read requests; and
   calculating a difference between the logged amount of data written to the data storage unit and the logged amount of data read from other than the video zone, wherein the logged amount of data written to the data storage unit is determined to exceed the write threshold if the calculated difference is greater than the write threshold and ripping is determined to be taking place if a ratio of the calculated difference and the logged amount of data read from the video zone is greater than a threshold.

3. The method according to claim 2, wherein the read threshold is in the range of 10 megabytes to 10 gigabytes.

4. A computer system comprising:
a media drive having a computer readable medium storing digital content;
a data storage unit; and
a processor adapted to execute an application program and a device driver, wherein the device driver intercepts communications between the application program and the media drive; monitors write requests issued by the application program to the media drive and logs an amount of data written to the data storage unit in response to the write requests; monitors read requests issued by the application program to the media drive and logs an amount of data read from a video zone on the computer readable medium in response to the read requests; modifies read requests from the application program to the media drive after the logged amount of data read from the video zone exceeds a read threshold, the logged amount of data written to the data storage unit exceeds a write threshold, and a ratio including the logged amount of data written to the data storage device and the logged amount of data read from the video zone that indicates ripping is taking place; and sends the modified read requests to the media drive.

5. The computer system according to claim 4, wherein the device driver logs an amount of data read from other than the video zone on the computer readable medium in response to the read requests, calculates a difference between the logged amount of data written to the data storage unit and the logged amount of data read from the other than the video zone, use the calculated difference for determining whether the logged amount of data written to the data storage unit exceeds the write threshold and determining whether ripping to taking place by, and use the calculated difference in the ratio to determine whether ripping is taking place.

6. The computer system according to claim 5, wherein the read threshold is in the range of 10 megabytes to 10 gigabytes.

* * * * *